United States Patent Office 2,931,754
Patented Apr. 5, 1960

2,931,754

METHOD OF CONTROLLING MICROORGANISM GROWTH WITH HALOACETIC ACID ESTERS OF ACETYLENIC GLYCOLS

Joseph R. Baldridge, Painesville, Ohio, assignor to Diamond Alkali Company, Cleveland, Ohio, a corporation of Delaware No Drawing. Application September 17, 1956
Serial No. 610,390

4 Claims. (Cl. 167—22)

This invention relates to novel compounds having the structure $$Y-C\equiv C-(CZ_1Z_2)_a-O-\overset{O}{\underset{\|}{C}}-CH_bX_c$$

wherein Y is selected from the group consisting of hydrogen and $$-[(CZ_3Z_4)_{a'}-O-\overset{O}{\underset{\|}{C}}-CH_{b'}X_{c'}]$$

a and a' are numbers from 1 to 3, inclusive, b and b' are numbers from 0 to 2, inclusive, c and c' are each numbers from 1 to 3, inclusive, X is a halogen, including fluorine, chlorine, bromine and iodine, although chlorine is preferred, and $Z_1$, $Z_2$, $Z_3$ and $Z_4$ are the same or different radicals selected from the group consisting of hydrogen, alkyl and aryl radicals.

More particularly, the present invention is directed to novel compounds having the structure $$Y-C\equiv C-(CH_2)_a-O-\overset{O}{\underset{\|}{C}}-CH_bX_c$$

wherein Y is hydrogen or $$-[(CH_2)_{a'}-O-\overset{O}{\underset{\|}{C}}-CH_{b'}X_{c'}]$$

a and a' are numbers from 1 to 3 inclusive, b and b' are numbers from 0 to 2, inclusive, c and c' are each numbers from 1 to 3, inclusive, X is a halogen, including fluorine, chlorine, bromine and iodine, although chlorine is preferred.

Even more specifically, the present invention is especially concerned with those compounds of the above type which are haloacetic acid esters of acetylenically-unsaturated carbinols, e.g., alcohols, glycols, and the like, notably choracetic acid esters of straight chain acetylenically-unsaturated carbinols, i.e., those having the following structure:

$$Y-C\equiv C-CH_2-O-\overset{O}{\underset{\|}{C}}-CH_mX_n$$

wherein Y is hydrogen or $$(CH_2-O-\overset{O}{\underset{\|}{C}}-CH_{m'}X_{n'})$$

X is a halogen, including fluorine, chlorine, bromine and iodine, although chlorine is preferred, m and m' are numbers from 0 to 2 and n and n' are each numbers from 1 to 3, respectively.

Compounds of this invention have general utility as biologically active substances and have exhibited specific biological activity as herbicides, aphicides, fungicides, defoliants and the like. Such compounds also are, of course, useful intermediates in the preparation of other organic substances either via reaction at the acetylenic bond or at a terminal halogen atom. Moreover, their usefulness extends to the fields of petroleum and motor fuel additives, textile treating agents, adhesives, pharmaceuticals, rubber additives, resin additives, leather treating agents, cellulose and paper additives, preservatives, coatings, and the like. Illustrative of specific compounds of the foregoing type coming within the scope of this invention are:

1,4-bis(chloracetoxy)-butyne 2
Propargyl monochloracetate
1,4-bis(dichloracetoxy)-butyne-2
1,4-bis(iodoacetoxy)-butyne 2

While compounds of the present invention may be employed in a variety of applications, biologically active or otherwise, when employed as biologically active materials, it will be understood, of course, that such compounds may be utilized in diverse formulations, both liquid and solid, including finely-divided powders and granular materials as well as liquids, e.g., solutions, concentrates, emulsifiable concentrates, slurries and the like, depending upon the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners such as various clays, diatomaceous earth, talc, spent catalyst, alumina silica materials and such liquid solvents, diluents, etc., as water and various organic liquids such as kerosene, acetone, benzene, toluene, xylene and other petroleum distillate fractions or mixtures thereof.

When liquid formulations are employed, or dried materials prepared which are to be used in liquid form, it is desirable in certain instances additionally to employ a wetting, emulsifying or dispersing agent to facilitate use of the formulation, e.g., Triton X-155 (alkyl aryl polyether alcohol).

In preparing compounds of the above type, it generally is desirable to effect the reaction by refluxing the reactants in an organic medium such, e.g., as benzene, toluene, xylene, or other suitable organic liquids. Further it is desirable to employ as a reaction promoter a minor amount of an agent which does not attack the acetylenic bond but which does facilitate the splitting out of water. Suitable reaction promoters include sulfonic acids such as toluene sulfonic acid, benzene sulfonic acid or xylene sulfonic acid. The specifically preferred promoter at present is p-toluene sulfonic acid.

In order that those skilled in the art may more completely understand the present invention and the preferred methods by which the same may be carried into effect, the following specific examples are offered:

EXAMPLE I

Part A

PREPARATION OF 1,4-BIS-(CHLORACETOXY)-BUTYNE-2

To a 2000 ml., 3-necked round-bottomed flask equipped with an agitator, condenser and water trap is added 86 gm. (1.0 mol) of 2-butyne-1,4-diol, and 500 ml. of benzene. This mixture is refluxed with stirring for 3½ hours to remove any water present at the end of which time approximately 0.5 ml. of water is removed. To this material is then added 0.5 gm. 2-butyne-1,4-diol, 189.0 gm. (2.0 mols) of monochloroacetic acid and 10.0 gm. p-toluene sulfonic acid monohydrate (9.4% H₂O). This mixture is refluxed with continuous agitation for about four hours until a total of 36.8 ml. of water is separated (theoretical amount 36.0 ml.).

The benzene solution which had contained butyne diol and monochloracetic acid is washed twice with 200 ml. portions of water and once with 200 ml. of 5% sodium bicarbonate. It is then dried by filtering through calcium chloride. On standing, some solid separates in the bottom of the flask and is removed by decanting the resultant solid weighing 62.7 gm. The mother liquor is distilled at atmospheric pressure to remove benzene (490 ml. being removed at 80.0–80.5° C.). This distillation residue is cooled and seeded with a few crystals of the solid whereupon the residue solidifies.

This solid (191 gm.) is recrystallized twice from methanol and combined with the solid initially recovered and the whole mass is recrystallized again from ethanol. The resultant solid is recrystallized from n-hexane to obtain 163.4 gm. of white crystals melting at 62.8°–63.3° C. Chemical analysis of this product indicates formation of the desired $C_8H_8Cl_2O_4$ and is as follows:

| Element | Actual, Percent | Calculated, Percent |
|---|---|---|
| C | 40.40 | 40.17 |
| H | 3.36 | 3.36 |
| Cl | 29.8 | 29.7 |

The references hereinafter in the examples to various formulations, unless otherwise indicated, will refer to aqueous formulations prepared by dissolving the active chemical in acetone, if necessary, and then dispersing or dissolving this material in water, using when necessary, a small amount, e.g., 0.01% by weight, of a dispersing or emulsifying agent such as Triton X–155 (alkyl aryl polyether alcohol).

Part B

To illustrate the effectiveness of 1,4-bis(chloroacetoxy)-butyne-2 as an insecticide, tests are conducted against roaches by anesthetizing German cockroaches (*Blatella germanica*) 8 to 9 weeks old with carbon dioxide to facilitate handling and are then dipped into a test formulation of 1,4-bis(chloracetoxy)-butyne-2 (2000 p.p.m.) for ten seconds, removed, freed of excess liquid and caged. Two lots of 10 insects each are so treated. Mortality observation after three days indicates 95% mortality, thus indicating a high degree of insecticidal activity. An untreated check test indicates a 0% mortality. A further test against roaches at a concentration of 1000 p.p.m. indicates a 90% mortality.

Part C

A further test is carried out to indicate systemic aphicidal activity by pouring a test formulation of 1,4-bis(chloracetoxy)-butyne-2 at a concentration of 64 pounds per acre in 2½ inch pots each containing two young nasturtium plants 3 to 5 inches tall. Twenty-four hours later the four seed leaves in each pot are infested with adult two-spotted spider mites (*Tetranychus bimaculatus*). The results of such tests indicate that a 90% mite mortality is observed, thus indicating a high degree of biological activity. An untreated check exhibits only 15% mortality. A further test to demonstrate systematic activity against aphids indicates a 94% mortality at a concentration of 32 pounds per acre 3 days after treatment.

Part D

To demonstrate fungicidal activity of compounds of this invention slide germination tests are conducted using 1,4-(chloracetoxy)-butyne-2 in the procedure recommended by The American Phytopathological Society which comprises using formulations containing the 1,4-(chloracetoxy)-butyne-2 in concentrations (prior to dilution of 4 volumes of 1 volume of spore stimulant in spore suspension) of 1000, 100, 10 and 1 p.p.m., respectively, in tests wherein fungi are contacted therewith to inhibit spore germination. More specifically, spores from 7 to 10 day old cultures of *Alternaria oleracea* and *Monilinia fructicola* are contacted with the test fungicide and germination records are taken after 20 hours of incubation at 22° C. by counting 100 spores. As a result of this test, it is observed that 1,4-(chloracetoxy)-butyne-2 exhibits an ED 50 value, i.e., the concentration which inhibits germination of one-half the spores in the test drops, of at least 1.0 to 10 p.p.m.

Part E

Tests are conducted to demonstrate herbicidal activity of 1,4-(chloracetoxy)-butyne-2. The systemic action is indicated by soil watering. In this test, the product of Part A is applied at the rate of 128 pounds per acre to soil in which tomato and bean plants are growing. It is observed that both types of plants are killed, thus indicating a high degree of phytotoxicity at the concentration employed.

Part F

Further to indicate herbicial activity, tests are conducted against broadleaf and grass plants using the product of Part A at a concentration of 64 pounds per acre. The resulting estimated percentage stand, compared to check and other responses, at this concentration of 2% broadleaf and 100% grass is observed.

Part G

Further tests are conducted using the product of Part A as a foliage spray against tomato, corn, bean, and oats. Rating the observed phytotoxicity effect on a scale from 0=no injury to 11=plants killed, ratings of 2, 1 and 0 against tomato, corn and oats, respectively, are observed while against the bean plants a rating of 11 is noted indicating the bean plants are killed, using a concentration of 6400 parts per million.

Part H

To illustrate defoliant activity, the product of Part A is employed at a concentration of 0.64% by weight as a spray on 57 day old cotton plants. Seven days after spraying it is observed that 88% of the leaves have dropped, thus indicating a high degree of defoliant activity. A commercial defoliant applied in the same manner at a concentration of 1.0% exhibits at 7 days only a 68% leaf drop, while untreated plants do not drop any leaves.

EXAMPLE II

Part A

PREPARATION OF PROPARGYL MONOCHLORACETATE

To a 2000 ml., 3-necked round-bottomed flask equipped with an agitator, reflux condenser and water trap are added 112 gm. (2.0 mols) of propargyl alcohol, 189.0 gm. (2.0 mols) of monochloracetic acid, and 500 ml. of benzene. To this mixture is added 10 gm. of p-toluene sulfonic acid and the resultant mixture is heated to reflux with stirring. Refluxing is continued for three hours by which time a total of 42 ml. of water is collected. 455 ml. of benzene is then distilled off and the liquid residue is washed with two 100 ml. portions of water and dried by filtering through calcium chloride.

The thus-dried residue is then distilled at reduced pressure and the fraction boiling between 90° and 91° C. is collected as the desired product and weights 191 gm. Chemical analysis indicates formation of the desired $C_5H_5ClO_2$ and is as follows:

| | Actual | Calculated |
|---|---|---|
| Percent Chlorine | 27.0 | 26.8 |

The refractive index of this product is $n_d^{23}$ 1.4578.

Part B

To illustrate miticidal activity, adult spider mites (*Tetranychus bimaculatus*) are applied to uninfested seed leaves of bean plants growing in 2½ inch diameter clay pots. One day after the mites are applied, the plants are sprayed with an aqueous formulation containing propargyl monochloracetate at a concentration of 2000 p.p.m.

It is observed that a 72% mite mortality is achieved, as against an untreated check sample of 18%.

Part C

To illustrate the fungicidal effectiveness of propargyl monochloracetate the general procedure of Example I, Part D is repeated. In this procedure, the propargyl monochloracetate exhibits an ED–50 value of at least 0.1 to 1.0 p.p.m.

Part D

To illustrate phytotoxicity of propargyl monochloracetate, tests are conducted via soil watering at a rate of 128 lbs. per acre against tomato and bean plants. At the concentration employed, both types of plants are killed.

Part E

Further to illustrate biological activity as nematocides, propargyl monochloracetate is employed as a nematocide against the nematode (*Panagrellus redivivus*) by placing such nematodes in small watch glasses (27 mm. in diameter x 8 mm. deep, disposed in a 9 cm. Petri dish). The propargyl monochloracetate is employed as an aqueous solution at a concentration of 500 p.p.m. and after 24 hours' exposure thereto, it is observed that 100% mortality via contact action and 80% mortality via fumigant action results. This procedure is repeated at a concentration of 2500 p.p.m. A 100% mortality, both with respect to contact and fumigant action, is observed. Check samples exhibit but a 7–10% mortality.

EXAMPLE III

Part A

PREPARATION OF 1,4-BIS(DICHLORACETOXY)-BUTYNE-2

To a 2000 ml., 3-necked round-bottomed flask equipped with an agitator, reflux condenser and water trap are introduced 86.5 gm. (1.0 mol) of 2-butyne-1,4-diol, 10 gm. of p-toluene sulfonic acid, 258 gm. (2.0 mols) of dichloroacetic acid and 500 ml. of benzene. This mixture is refluxed with stirring until a total of 33 ml. of water is collected. The resultant material is then filtered, washed with six 200 ml. portions of water and dried by filtering through calcium chloride. Benzene is removed by distillation at reduced pressure and the distillation residue is treated with decolorizing carbon and filtered to recover 171 gm. of amber-colored oil. Chemical analysis of this material indicates formation of the desired $C_8H_6O_4Cl_4$ and is as follows:

|  | Actual | Calculated |
|---|---|---|
| Percent Chlorine | 43.5 | 46.1 |

Part B

To indicate effectiveness of the 1,4-bis(dichloracetoxy)-butyne-2 as a bactericide, tests have been conducted using this chemical in an aqueous formulation at a concentration of 1000 p.p.m. against the bacteria *X. phaseoli*, and *S. aureus*. The growths of the four organisms after a four hour exposure to the test compound indicate that a rating of B is obtained against *X. phaseoli* and *S. aureus* as contrasted with the rating of D against an untreated check sample.

Part C

To indicate nematocidal activity of 1,4-bis(dichloracetoxy)-butyne-2, the procedure of Example II, Part E, is repeated using this compound at a concentration of 2000 p.p.m. There is observed a 100% nematode mortality after 24 hours. An untreated check sample in the same test exhibits a nematode mortality of only 4%.

Part D

To indicate pre-emergent herbicidal activity of the 1,4-bis(dichloracetoxy)-butyne-2, tests are conducted using this compound at a concentration of 64 pounds per acre. The estimated percentage stand compared to check and other responses, at this concentration indicates a 100 to grass stand and 0% broadleaf stand.

EXAMPLE IV

Part A

PREPARATION OF 1,4-BIS(IODOACETOXY)-BUTYNE-2

119.5 gms. (0.5 mol) of 1,4-bis(chloracetoxy)-butyne-2, produced in accordance with the method of Example I, Part A, is dissolved in 300 ml. of acetone. A second solution is prepared by dissolving 150 gm. (1.0 mol) of sodium iodide in 500 ml. of acetone. These two solutions are combined with agitation and are allowed to stand until precipitation of sodium chloride stops. The solid sodium chloride is then filtered off and the residue washed with acetone.

To the filtrate, after sodium chloride removal and acetone wash is added 2000 ml. of water with agitation, which results in the formation of a heavy yellow oil. This oil and the aqueous-acetone layer are separated and the remaining low boiling material is removed at reduced pressure. There result 194 gm. of oil which chemical analysis reveals contains 57.5% iodine (theoretical 60.2%). The refractive index is $N_d^{23}$ 1.5825.

Part B

The procedure of Example I, Part C, is repeated, using 1,4-bis-(iodoacetoxy)-butyne-2. An 80% aphid mortality results.

Part C

The procedure of Example I, Part D, is repeated using 1,4-bis-(iodoacetoxy)-butyne-2. An ED–50 value of at least 0.1 to 1.0 p.p.m. is observed.

Part D 1,4-bis-(iodoacetoxy)-butyne-2 is employed as a fungicide against tomato foliage blight with the result that at a concentration of 128 p.p.m. an 88% disease control is observed regarding the early blight caused by *Alternaria solani*. Similar tests conducted against late blight caused by *Phytophthora infestans* reveals a 100% control at a concentration of 256 p.p.m. In the latter instance a slight phytotoxic effect is also observed.

Part E

The procedure of Example III, Part B, is repeated to indicate effectiveness of 1,4-bis-(iodoacetoxy)-butyne-2 as a bactericide. The results of this test indicate that a comparative rating of A is observed against *X. phaseoli*, *S. aureus* and *E. coli* as compared to an untreated check value of D.

Part F

The procedure of Example I, Part G, is repeated to demonstrate phytotoxicity wherein 1,4-bis-(iodoacetoxy)-butyne-2 is employed as a foliage spray at a concentration of 6400 p.p.m. against tomato, bean, corn and oats. Rating the phytotoxic effect on a scale from 0=no injury to 11=plant kill, it is observed that values of 11, 11, 8, and 10, respectively are obtained against tomato, bean, corn and oats. Further tests carried out by applying 1,4-bis-(iodoacetoxy)-butyne-2 by soil-watering at a concentration of 128 lbs. per acre against tomato and bean plants indicates that in each instance the plants are killed. Untreated check plants reflect no phytotoxic effect.

Part G

The procedure of Example I, Part F is repeated further to demonstrate pre-emergent herbicidal activity. In this procedure 1,4-bis-(iodoacetoxy)-butyne-2 is employed at a concentration of 32 pounds per acre. The estimated percentage stand is compared to checks in other responses on broad leaf and grass plants respectively are 0 and 100%, thus indicating a high degree of pre-emergent herbicidal activity.

Part H

A post-emergent herbicidal spray test also is carried out at a concentration of 1600 p.p.m. against tomato, bean, corn and oats. The phytotoxic ratings observed using a scale from 0 to 11 are, respectively, 11, 11, 1 and 2, thus indicating at the concentration employed, selective herbicidal activity.

Part I

The procedure of Example II, Part E is repeated using 1,4-bis-(iodoacetoxy)-butyne-2 as a nematocide against the nematodes *Panagrellus redivivus*. A 100% contact mortality is observed after 24 hours at a concentration of 2000 p.p.m. An untreated check sample indicates but a 9% mortality.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of controlling microorganism growth which comprises contacting said microorganisms with a composition containing as an essential active ingredient a compound of the formula:

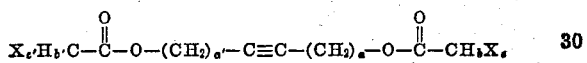

wherein X is halogen, $a$ and $a'$ are numbers from 1 to 3, inclusive, $b$ and $b'$ are numbers from 0 to 2, inclusive and $c$ and $c'$ are numbers from 1 to $(3-b)$ and 1 to $(3-b')$ respectively.

2. The method as claimed in claim 1 in which the essential active ingredient is 1,4-bis-(chloroacetoxy)-butyne-2.

3. The method as claimed in claim 1 in which the essential active ingredient is 1,4-bis-(dichloroacetoxy)-butyne-2.

4. The method as claimed in claim 1 in which the essential active ingredient is 1,4-bis-(iodoacetoxy)-butyne-2.

References Cited in the file of this patent

UNITED STATES PATENTS

| | | |
|---|---|---|
| 2,296,823 | Pollack et al. | Sept. 22, 1942 |
| 2,634,290 | Sonia et al. | Apr. 7, 1953 |
| 2,691,672 | Brust | Oct. 12, 1954 |
| 2,691,673 | Brust | Oct. 12, 1954 |
| 2,711,949 | Barrons | June 28, 1955 |
| 2,734,075 | Brust et al. | Feb. 7, 1956 |
| 2,801,160 | Iserson | July 30, 1957 |

FOREIGN PATENTS

| | | |
|---|---|---|
| 518,938 | Belgium | April 30, 1953 |

OTHER REFERENCES

Gryszkiewicz-Trochimowski et al.: Bull. Soc. Chim., France, 1953, 464.